US008951378B1

(12) United States Patent
McGee

(10) Patent No.: US 8,951,378 B1
(45) Date of Patent: Feb. 10, 2015

(54) METHOD FOR CREATING PERSONALIZED TILE AND TILE CREATED BY SAME

(76) Inventor: Oliver Justin McGee, Columbia, SC (US)

( * ) Notice: Subject to any disclaimer, the term of this patent is extended or adjusted under 35 U.S.C. 154(b) by 2071 days.

(21) Appl. No.: 11/780,848

(22) Filed: Jul. 20, 2007

Related U.S. Application Data

(60) Provisional application No. 60/807,955, filed on Jul. 21, 2006.

(51) Int. Cl.
*B32B 38/04* (2006.01)

(52) U.S. Cl.
USPC ............ 156/265; 156/62; 156/63; 156/89.11; 156/299; 156/307.3

(58) Field of Classification Search
USPC ............... 434/87, 82; 156/62, 63, 89.11, 265, 156/299, 307.3; 428/39, 67, 325, 542.2
See application file for complete search history.

(56) References Cited

U.S. PATENT DOCUMENTS 3,008,256 A * 11/1961 Rice ................................ 156/63
4,284,407 A * 8/1981 Hofstetter ........................ 434/82
2008/0110031 A1* 5/2008 Kolz ............................... 30/299

FOREIGN PATENT DOCUMENTS

DE 3536052 A * 4/1987

OTHER PUBLICATIONS

Personal Clay Box, Marvin Bartel, Jul. 17, 2006.*
WayBackMachine for Personal Clay Box, Jul. 17, 2006.*
Creating With Precious Metal Clay and Art Clay, Mschindel, Jul. 15, 2006.*
WayBackMachine for Creating With Precious Metal Clay, Jul. 15, 2006.*
Krista Wells, Polymer Clay Mosaics, 2005.*
Google books for Kirsta Wells, 2005.*
Tails by the Lake; http://www.tailsbythelake.com; Dog Gift; "Make Your Own Coaster Tiles" from Pet's Picture (downloaded Oct. 15, 2007).
Madison Art Shop; http://www.madisonartshop.com; Mosaic Coaster Kit (downloaded Oct. 15, 2007).

* cited by examiner

*Primary Examiner* — Linda L Gray
(74) *Attorney, Agent, or Firm* — Nelson Mullins Riley & Scarborough, LLP

(57) ABSTRACT

A method for creating personalized tile that includes creating a tile base, attaching borders to the tile base through the process of scoring and slipping the tile base and the borders to create a tile, and placing mosaics onto the tile.

20 Claims, 28 Drawing Sheets

METHOD FOR CREATING PERSONALIZED TILE AND TILE CREATED BY SAME

CLAIM OF PRIORITY

The present application claims the benefit of the U.S. provisional patent application filed on Jul. 21, 2006 by Oliver Justin McGee for METHOD AND APPARATUS FOR CREATING PERSONALIZED TILE (Ser. No. 60/807,955), the entire disclosure of which is hereby incorporated by reference herein.

FIELD OF THE INVENTION

The present invention relates to tile and, more particularly, to a method and apparatus for making personalized tile.

BACKGROUND OF THE INVENTION

Home improvement has steadily grown into an important and popular market. Tile is often used for flooring, countertops, and even on walls as backsplashes, showers, and decoration. Tiles can also be used in pools, as coasters, or as borders for hardwood floors. In addition, manufacturers have begun producing synthetic substitutions of these materials for the same uses. While both the synthetic and natural products may vary greatly with respect to color and design, consumers are constrained by the styles manufacturers choose to mass produce.

SUMMARY OF THE INVENTIONS

The present invention recognizes and addresses the foregoing considerations, and others, of prior art construction and methods.

In this regard, one aspect of the invention provides a method for creating personalized tile comprising the steps of flattening a first section of clay to create at least one slab of clay, tracing at least one outline of a first template into the slab to create at least one tile, cutting a first border from the slab, scoring a first edge of a bottom of the tile, slipping the edge, aligning the border with the edge, and placing the border on the tile.

According to another aspect, the present invention also provides a method for creating personalized tile comprising the steps of forming a tile from clay corresponding to a desired set of dimensions, creating a plurality of smaller mosaics from at least one larger mosaic, and attaching the smaller mosaics to the tile's top.

A further aspect of the present invention provides a method for creating personalized tile comprising the steps of forming a tile from a slab of clay, cutting four borders from the slab, attaching the borders to the tile, and attaching a mosaic to the tile.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1A:
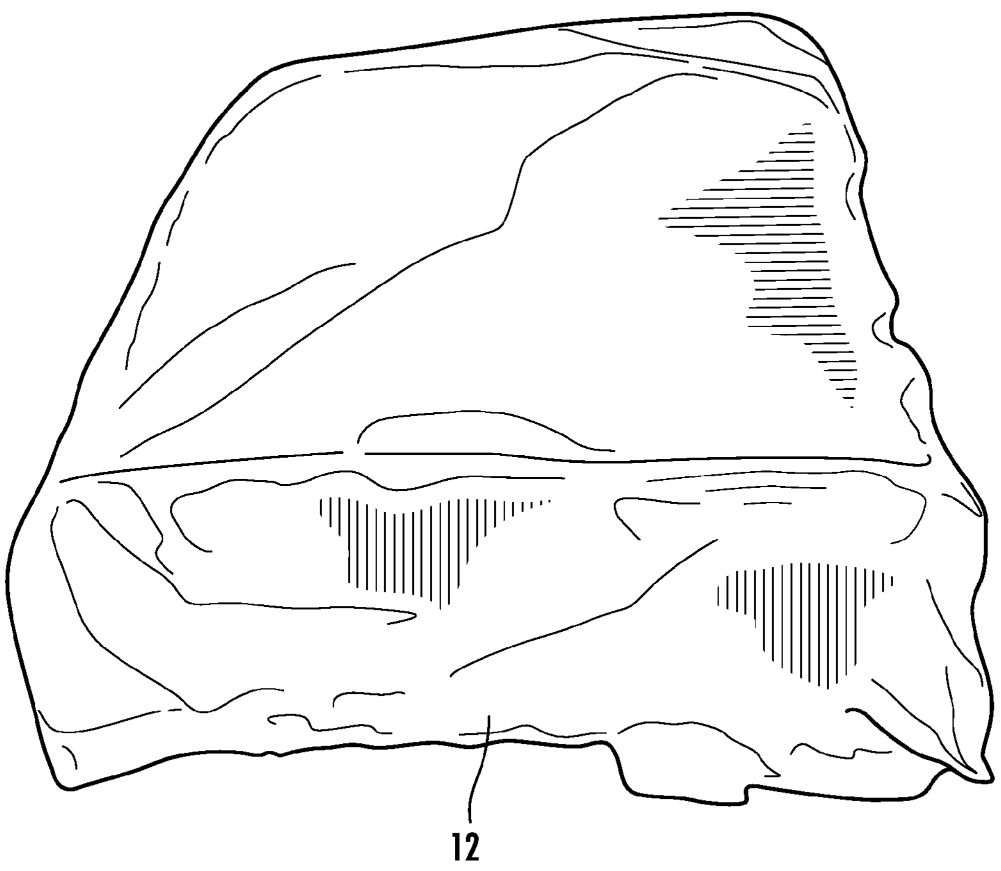
FIG. 1*a* is a perspective view of a bag of clay that may be used in accordance with an embodiment the present invention.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1B:
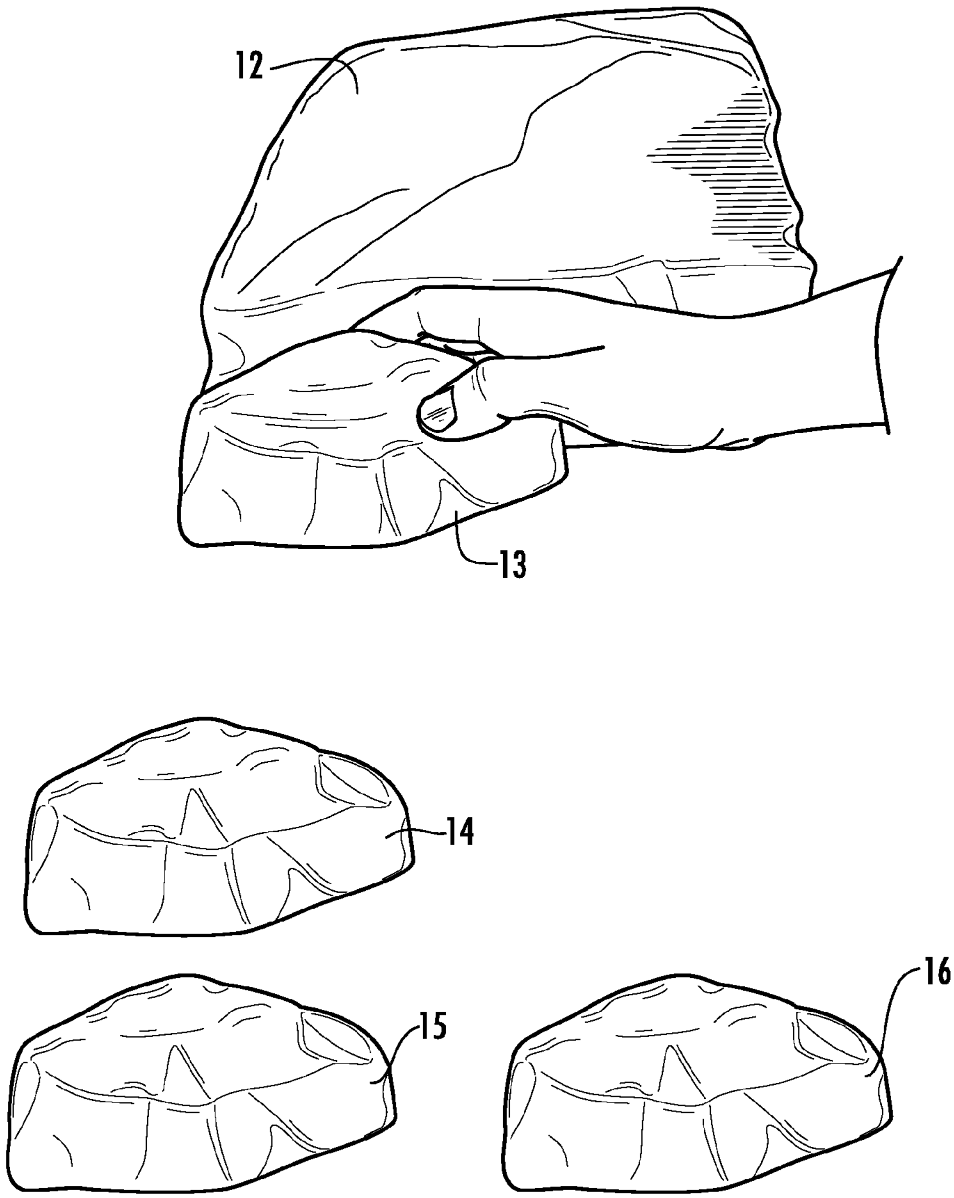
FIG. 1*b* is a perspective view of several blocks of clay removed from the bag of clay of FIG. 1 in accordance with an embodiment of the present invention.

Referring to FIGS. 1*a* and 1*b*, raw clay 10 of a suitable type is purchased from a supplier and is transported in a plastic bag, such as bag 12. Clay 10 is removed from bag 12 and separated into equivalent sections, such as sections 13, 14, 15, and 16. It should be important to note that the size and amount of clay in each section is not of major importance because each section will be rolled out and cut to other lengths.

Figure 2A:
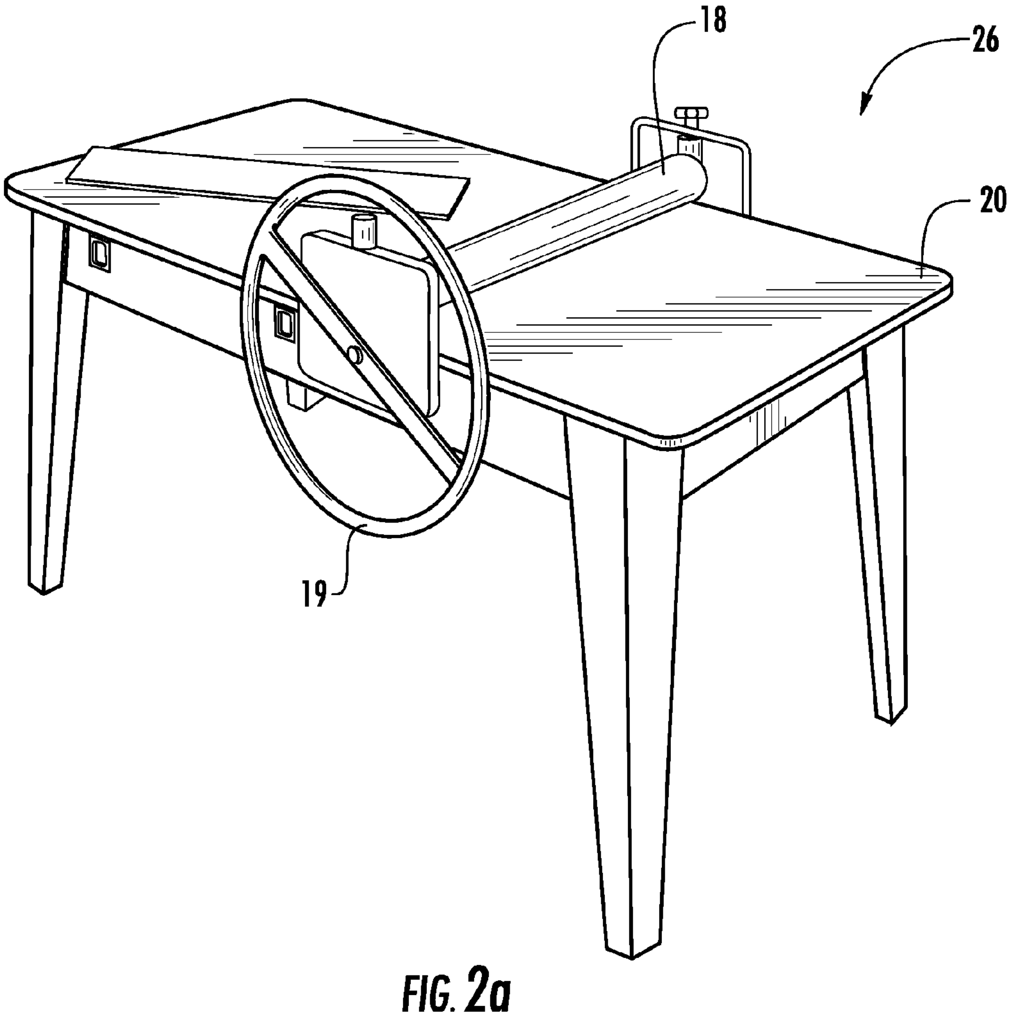
FIG. 2*a* is a perspective view of a slab roller to be used in accordance with an embodiment of the present invention.
Figure 2B:
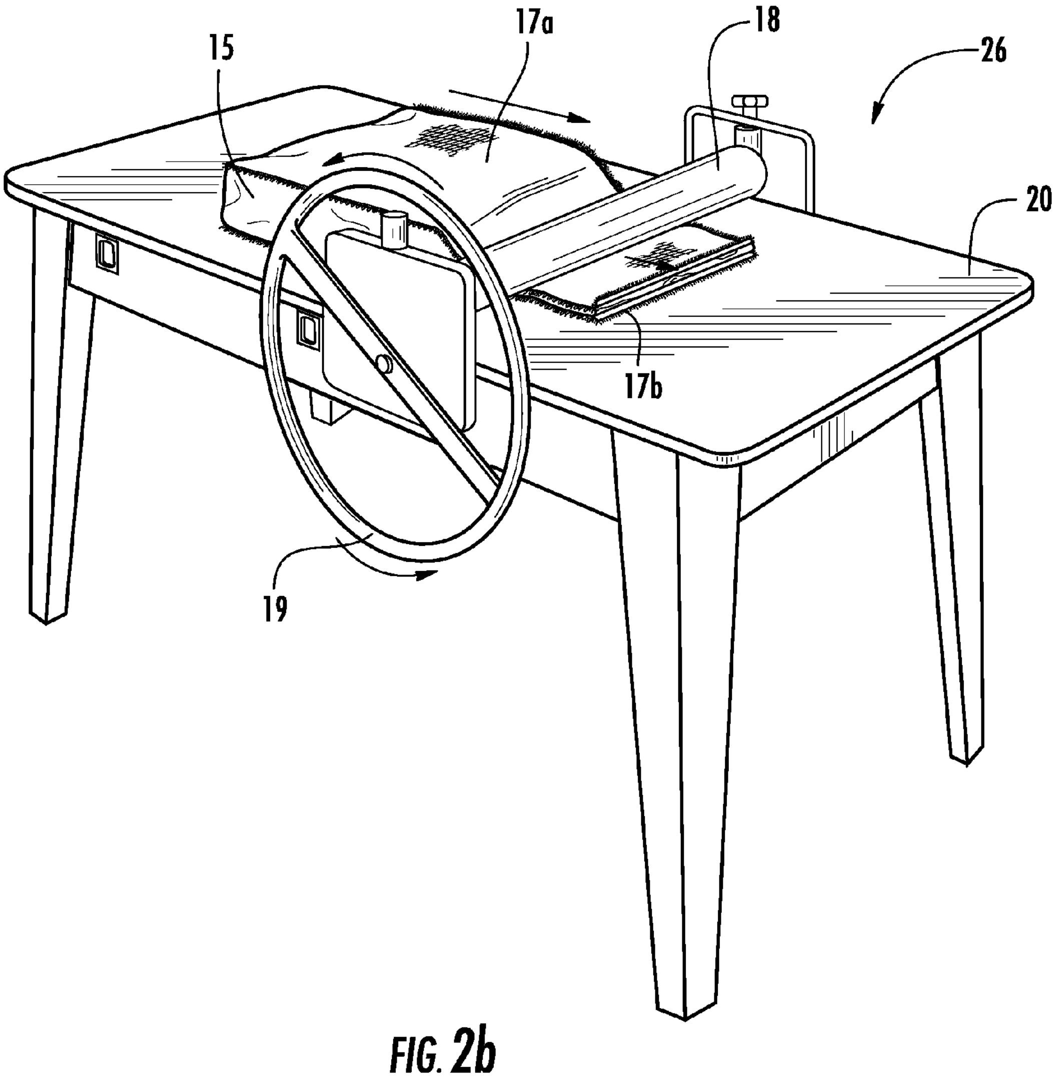
FIG. 2*b* is a perspective view illustrating a use of the slab roller of FIG. 2*a* in accordance with an embodiment of the present invention.

Referring to FIGS. 2*a* and 2*b*, each section of clay is placed between two pieces of material 17 such as burlap, which provide the clay sections with texture allowing for suction when used as flooring, countertops, etc. It should be understood that burlap is known in the art and that other materials capable of providing clay sections with a sufficient amount of texture may be used.

FIGS. 2*a* and 2*b* illustrate a slab-roller 26 to be used in accordance with an embodiment of the present invention. In this case, slab-roller 26 is a table comprising a rolling pin 18 situated horizontally across the table and attached to wheel 19. Slab-rollers should be known by those of ordinary skill in the art and are, therefore, not discussed in further detail. Any such slab-roller may be used, such as the STANDARD SLAB ROLLER manufactured by North Star Equipment, Inc. (Cheney, Wash.).

In operation, the user determines the desired thickness of the clay by vertically raising or lowering rolling pin 18 so that a space exists between the pin and the table's flat surface 20 corresponding to the desired thickness. In the depicted example, clay section 15 is placed between two burlap pieces 17 and fed through slab-roller 26 by turning wheel 19, which flattens clay section 15 to the desired thickness.

Figure 3:
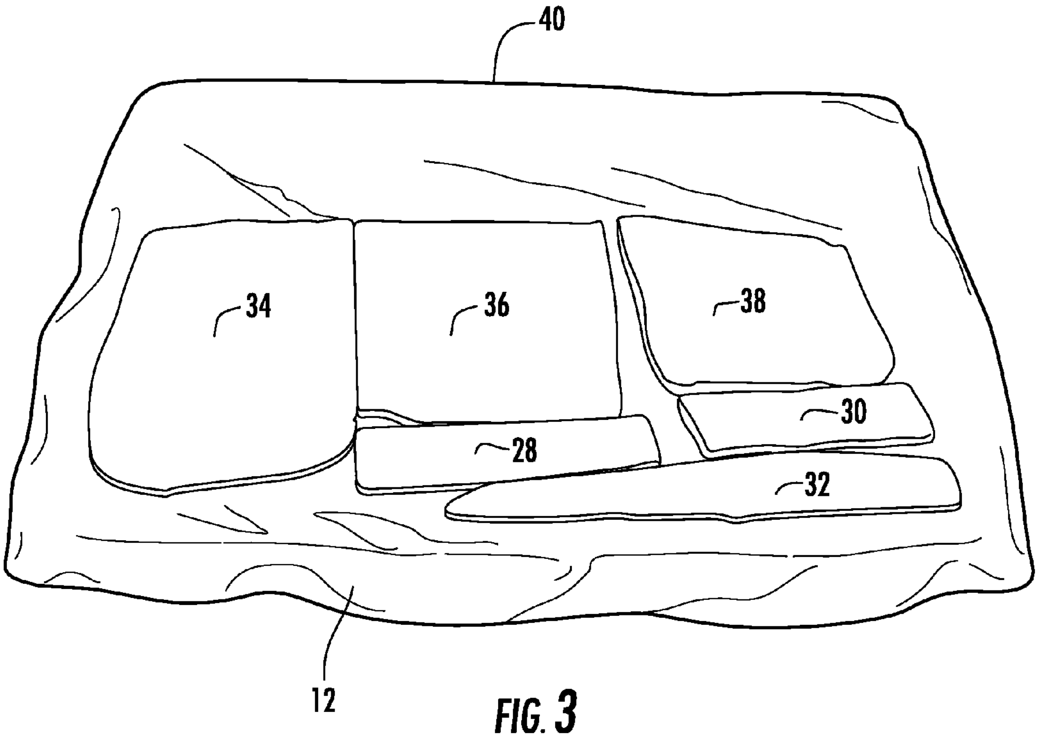
FIG. 3 is a perspective view of clay slabs in accordance with an embodiment of the present invention.

In an exemplary embodiment as shown in FIG. 3, a section of clay has been rolled into three (3) slabs 28, 30, and 32 having a thickness of approximately a quarter inch (¼") and three (3) slabs 34, 36, and 38 having a thickness of three-sixteenths of an inch (3/16"). Each slab 28, 30, 32, 34, 36, and 38 may be about two feet (2') long. Slabs 34, 36, and 38 will be later cut and used as borders as described below, while 28, 30, and 32 will be used as tile bases. It should be understood by one of ordinary skill in the art that clay shrinks when fired in a kiln and that different types of clay shrink different amounts. The user decides the size of the borders and bases according to type of clay and its intended application as he or she desires. This determination will impact the size of the slabs made as described above.

Slabs 28, 30, 32, 34, 36, and 38 are placed on a two foot by two foot (2'×2') plywood square 40, which may be covered with plastic bag 12 to minimize the loss of moisture that occurs when the clay sections come in contact with square 40. If the clay needs to be transported or stored at this point, plywood square 40, plastic bag 12, and slabs 28, 30, 32, 34, 36, and 38 may be placed in another plastic bag. Slabs 28, 30, 32, 34, 36, and 38 are then misted with water, and the additional plastic bag is sealed to prevent any additional moisture loss.

Figure 4:
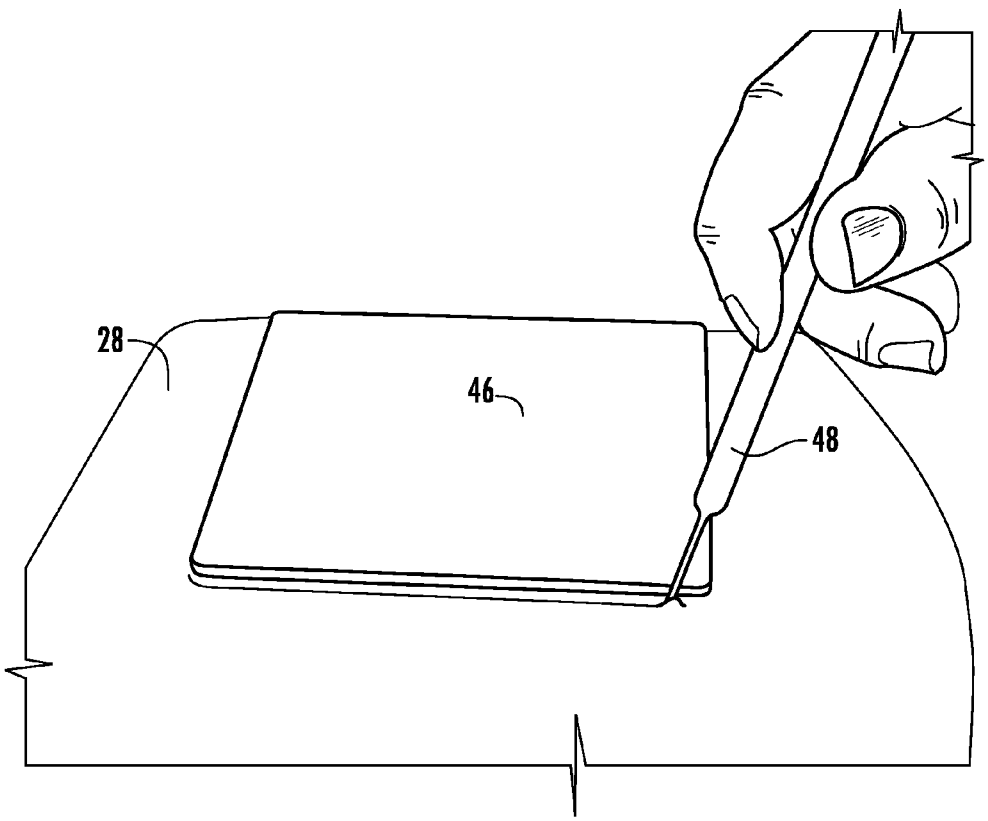
FIG. 4 is a perspective view illustrating a use of a template to be used in accordance with an embodiment of the present invention.

If slabs 28, 30, 32, 34, 36, and 38 have been previously sealed in an additional plastic bag, these slabs, plywood square 40, and plastic bag 12, are removed from the bag. Slabs 28, 30, 32, 34, 36, and 38 are then transported to a work area as shown in FIG. 4. The slabs are again preferably misted with water. Any cracks, impressions, or irregularities in thickness created from the splitting, rolling, or handling of the slabs may be removed by extensively rubbing the slabs with one's fingertips.

Figure 5:
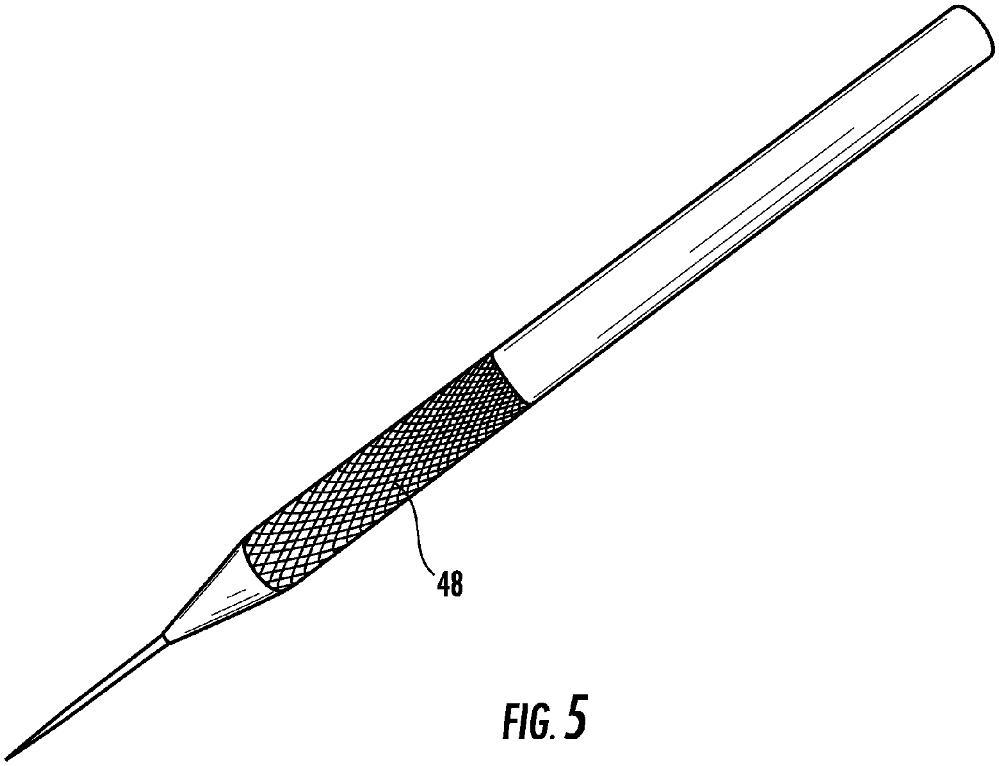
FIG. 5 is a perspective view of a trimming tool to be used in accordance with an embodiment of the present invention.

Template 46 is placed on top of slab 28, and its outline is preferably traced into slab 28 using trimming tool 48. Template 46 can be a piece of tile, marble, cardboard, or any other useful material that is representative of the final product's dimensions as desired by the user. It should be understood by one of ordinary skill in the art that trimming tool 48 is also known as a pointed shaping tool, a cutting tool, and also as a needle tool. FIG. 5 displays another view of trimming tool 48 in greater detail. The above process is repeated until no more tiles of similar dimensions can be outlined from slab 28 using template 46. It should be noted that templates of different sizes and shapes may be used to outline tiles from slab 28.

Figure 6:
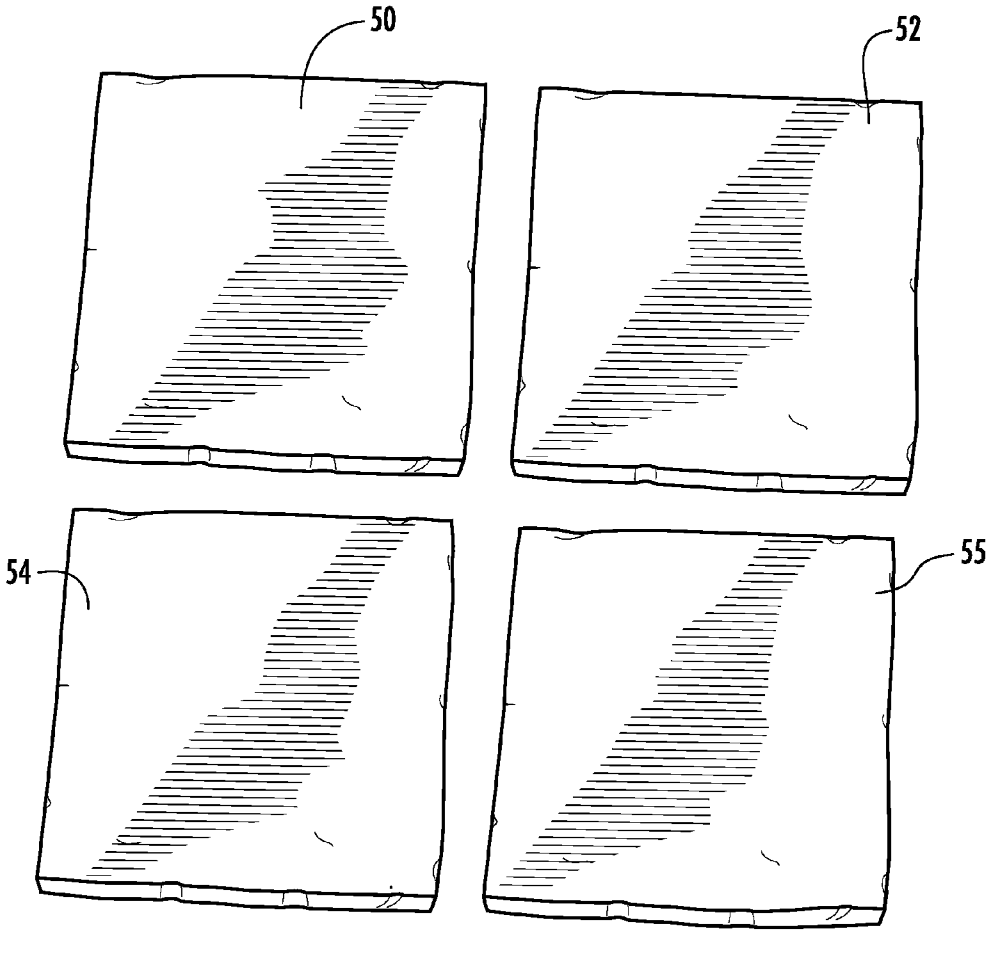
FIG. 6 is a perspective view of clay tiles in accordance with an embodiment of the present invention.

As shown in FIG. 6, outlined tiles 50, 52, 54, and 55 have been removed from slab 28. The leftover portion of slab 28 is placed in a bucket containing water. When leftover portions of clay are combined with water, they become what's known as "slip." It should be known to one of ordinary skill in the art that slip has many uses including the ability to be recycled into additional clay.

Figure 7:
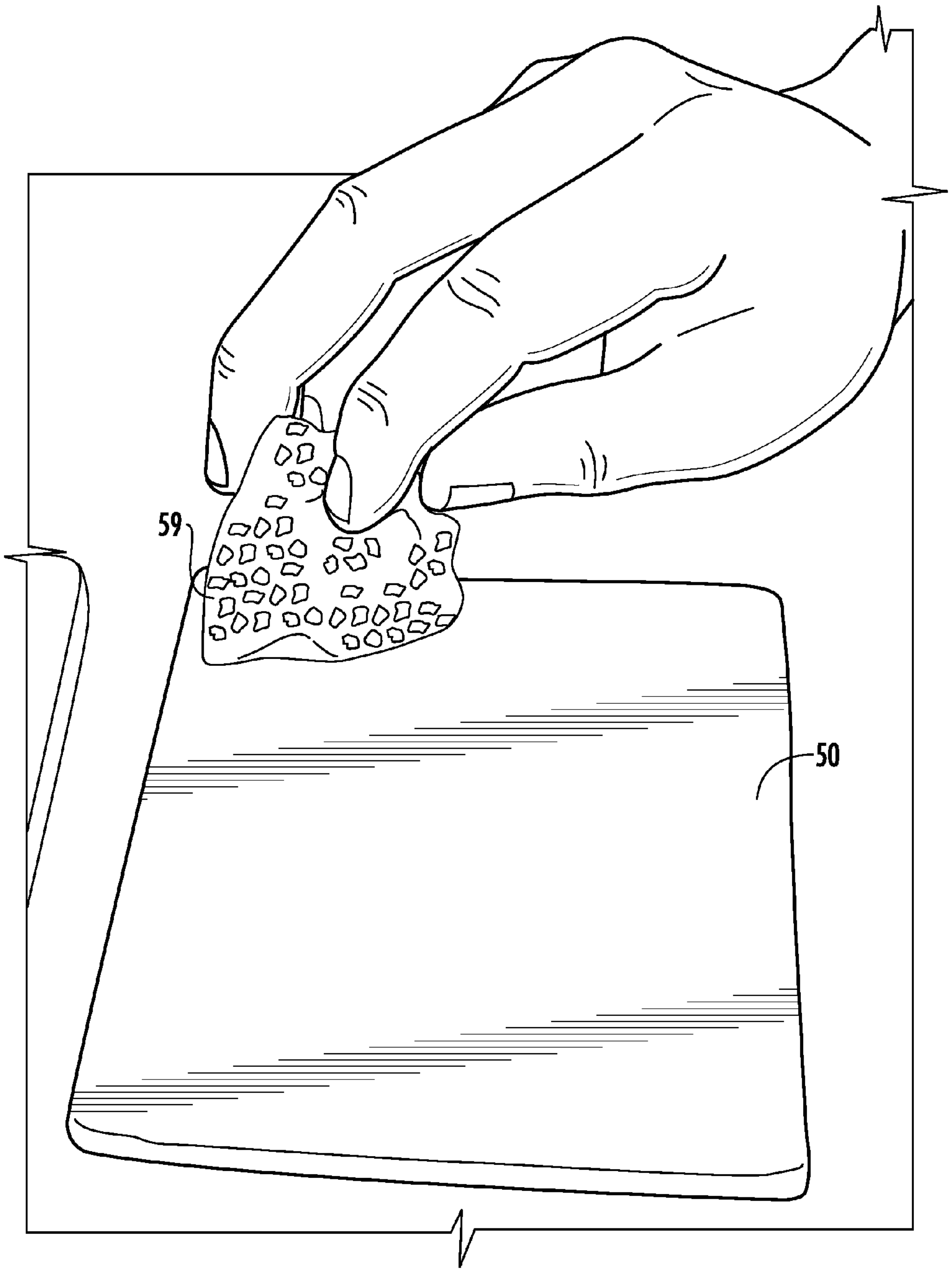
FIG. 7 is a perspective view illustrating a use of a sea sponge in accordance with an embodiment of the present invention.
Figure 8:
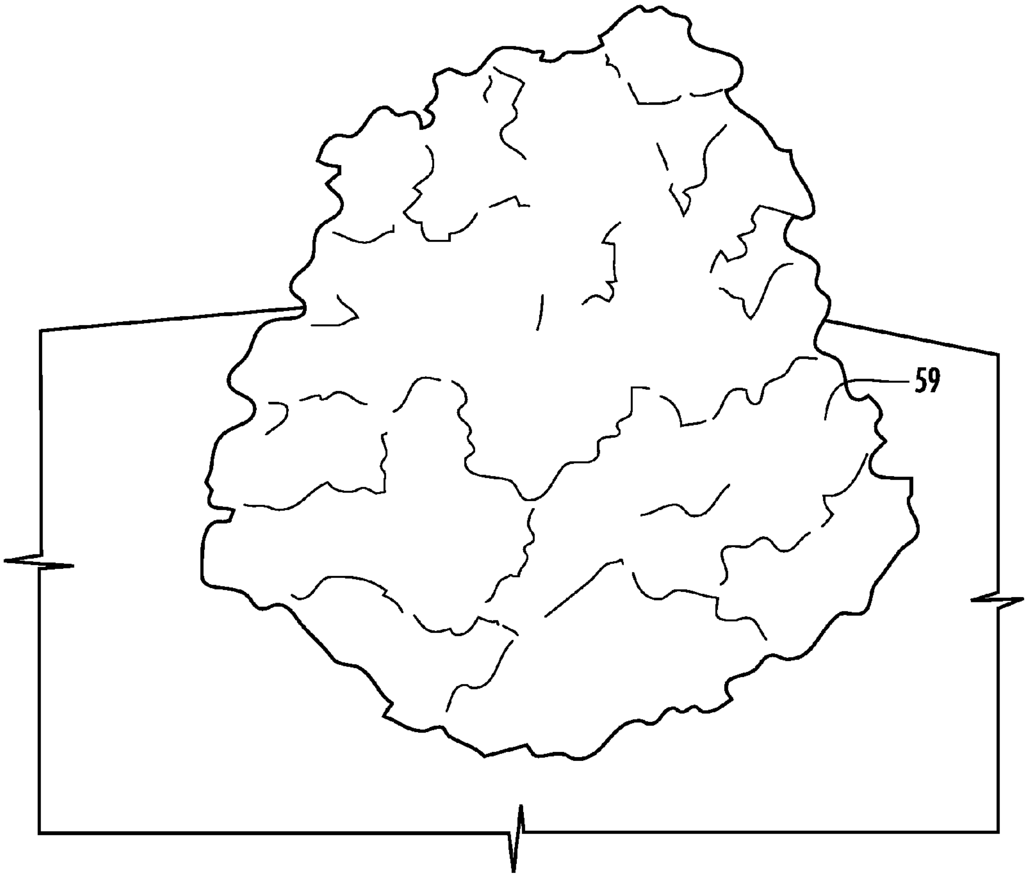
FIG. 8 is a perspective view of the sea sponge of FIG. 7 in accordance with an embodiment of the present invention.

FIG. 7 illustrates the use of a sea sponge 59 or the like, which has been wetted, to smooth out any imperfections or sharp edges from the top and sides of the removed tiles, as shown with reference to tile 50. The use of sea sponge 59 also ensures there are no height variations in the tiles' sides. This step also gives texture to the surfaces of the tiles, which allows mosaics to adhere to each tile properly as described below. FIG. 8 illustrates another view of sea sponge 59 in greater detail.

Figure 9:
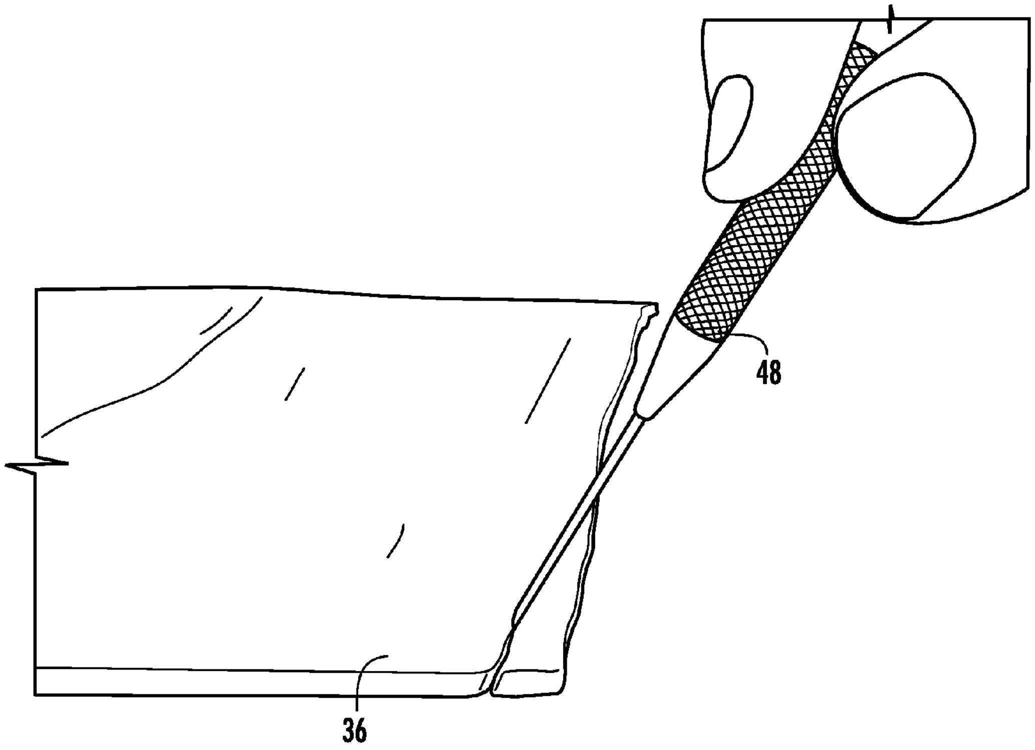
FIGS. 9 through 11 are perspective views illustrating a use of the trimming tool of FIG. 5 in accordance with an embodiment of the present invention.
Figure 10:
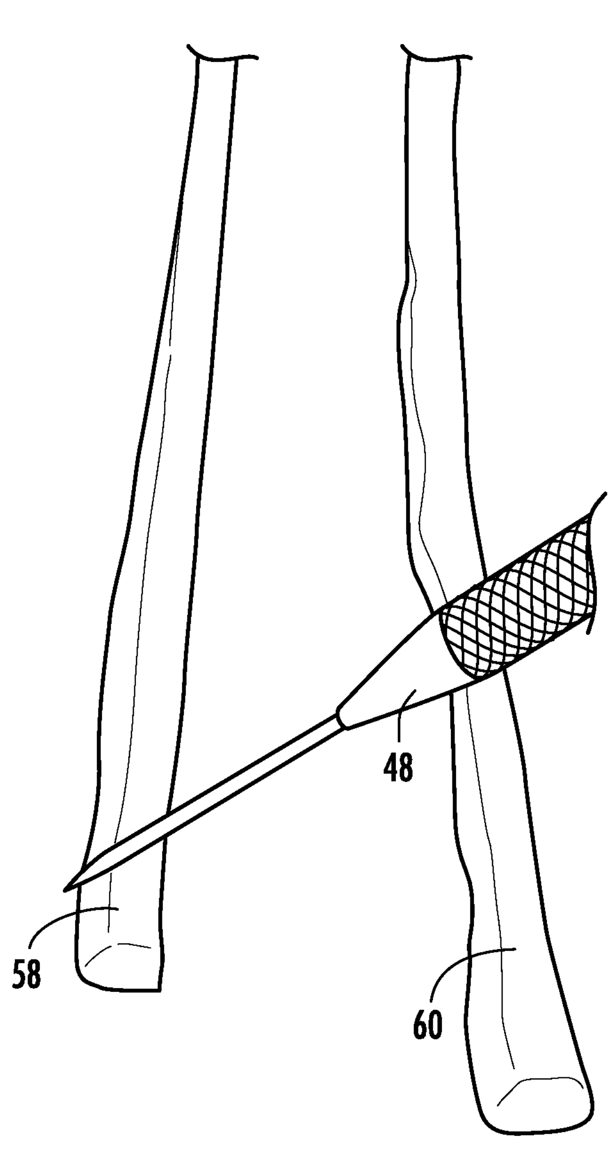

In an exemplary embodiment as shown in FIGS. 9 and 10, a slab preferably having a thickness of three sixteenths of an inch (3/16"), such as slab 36, is cut into two borders 58 and 60 using trimming tool 48. Preferably, border 58 is one eighth of an inch (⅛") wide by twelve inches (12") long and border 60 is a quarter inch (¼") wide by twelve inches (12") long. It should be understood that borders cut from slab 36 may consist of different shapes and sizes depending on the desired aesthetics of the personalized tile as described below. Using trimming tool 48 to divide slab 36 causes the widths of borders 58 and 60 to vary with a wavy appearance as shown in FIGS. 9 and 10. This is mainly for aesthetical value, giving the borders a custom-made appearance. It should be known that, if a uniform cut is desired, a straightedge or slicer can be used to create the borders. When cutting slab 36 into pieces, trimming tool 48 (or any other instrument used), is preferably held at an angle, such as a forty-five degree(45°) angle. As a result, one side of borders 58 and 60 will be straight, while the other will preferably be angled so that it tapers from the side's bottom to the side's top. Accordingly, the width of the base of borders 58 and 60 will be larger than the width of their tops as illustrated in FIGS. 9 and 10. This also allows the separated tile to appear as one piece when borders 58 and 60 are added to tiles 50, 52, 54, or 55 as described below.

Figure 11:
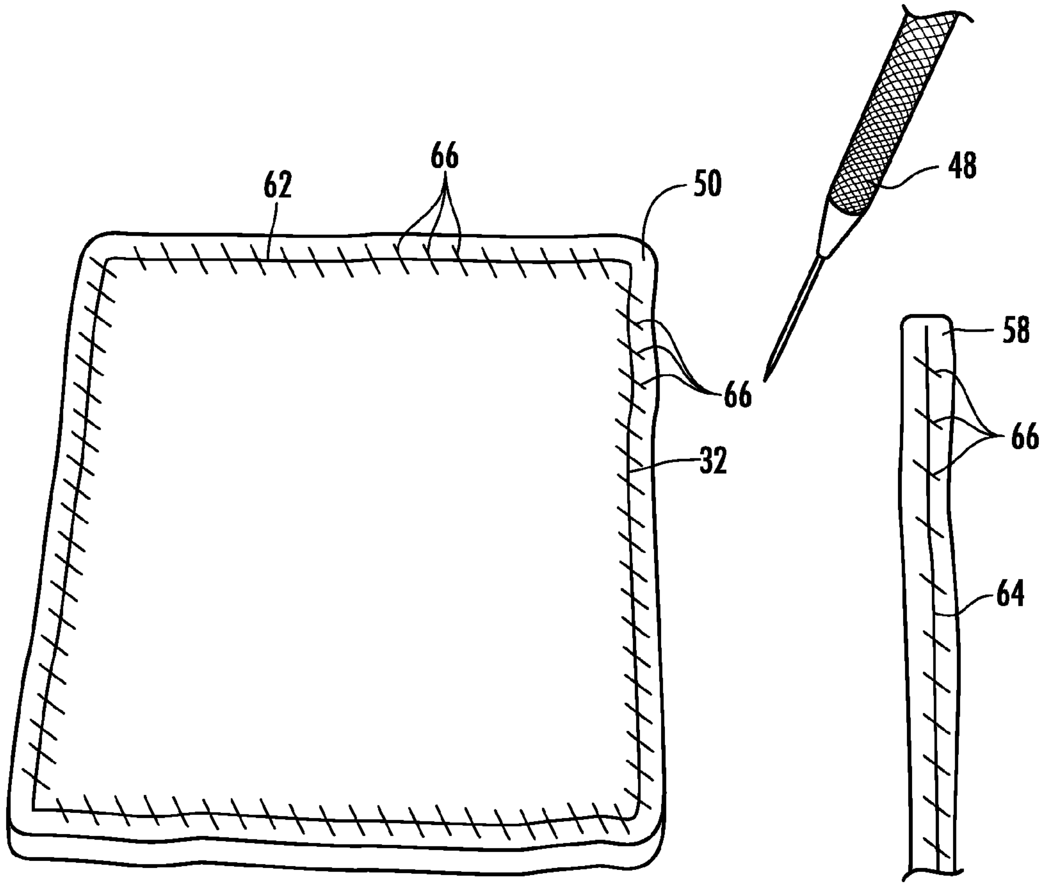
Figure 12:
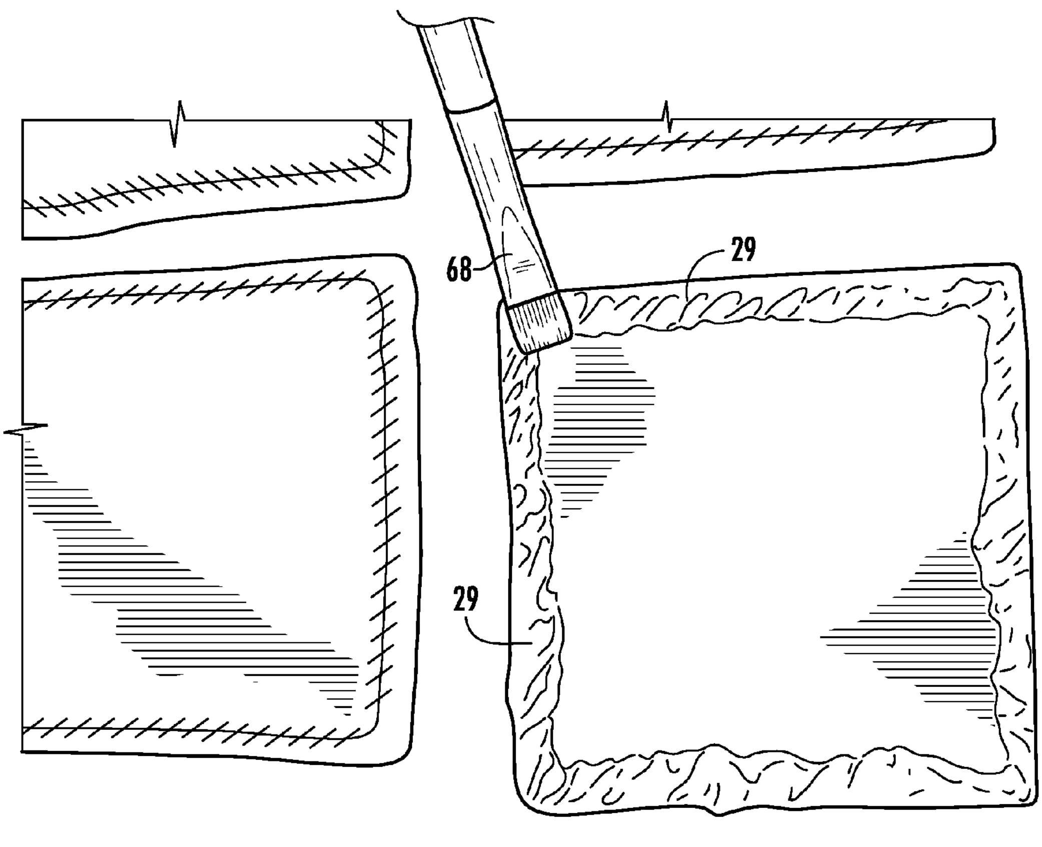
FIG. 12 is a perspective view illustrating a use of slip and a paintbrush tool in accordance with an embodiment of the present invention.
Figure 13:
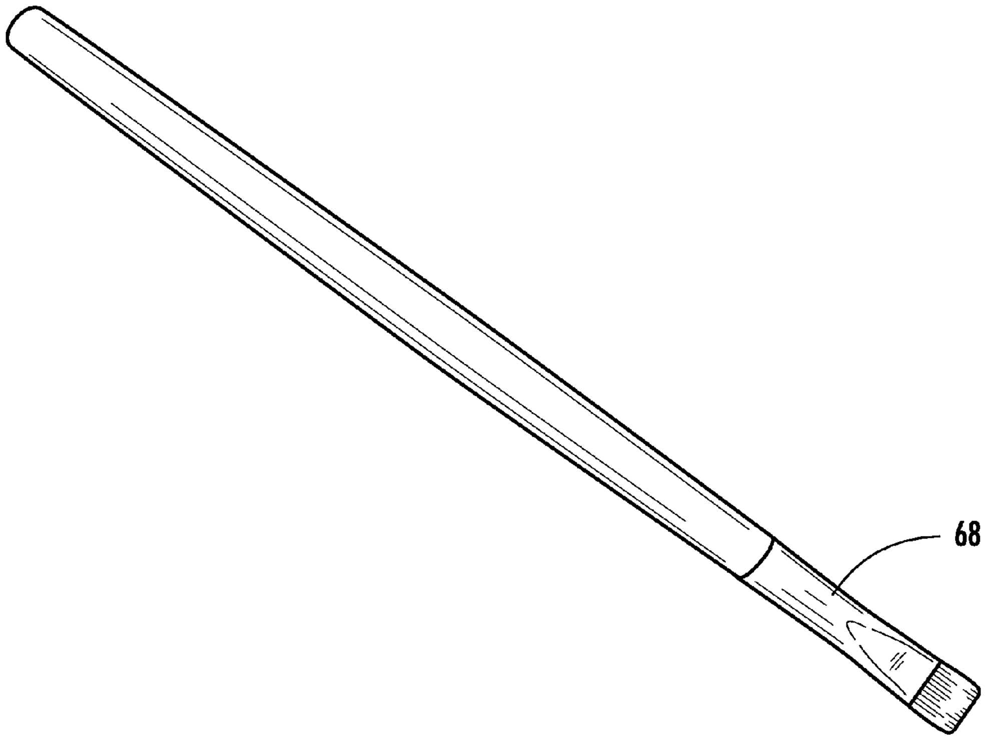
FIG. 13 is a perspective view of a paintbrush tool of FIG. 12.

Referring to FIG. 11, trimming tool 48 is used to draw a line around the perimeter of tile 50 and also down the center of border 58 as denoted by numbers 62 and 64, respectively. A number of hash marks (collectively denoted at 66) are drawn across lines 62 and 64 at an angle. This process is referred to as "scoring" and is important because it causes slip to act like glue when added to the base of tile 50 and border 58. Referring to FIG. 12, slip 29 is then pasted over hash marks 66 on tile 50 and border 58 using a number four (#4) paintbrush 68 (shown in greater detail in FIG. 13). This process is referred to as "slipping" and should be done quickly before slip 29 dries in order for it to act as an adhesive. It should be apparent that other suitable paintbrushes or devices suitable for applying slip may be used.

Figure 14:
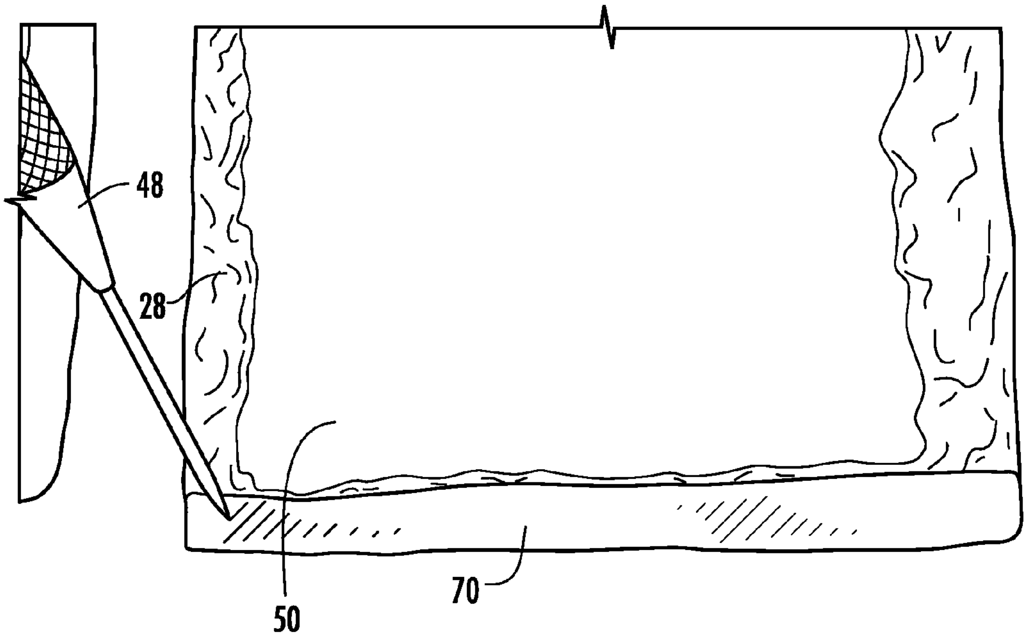
FIG. 14 is a perspective view illustrating a use of the trimming tool of FIG. 5 in accordance with an embodiment of the present invention.
Figure 15:
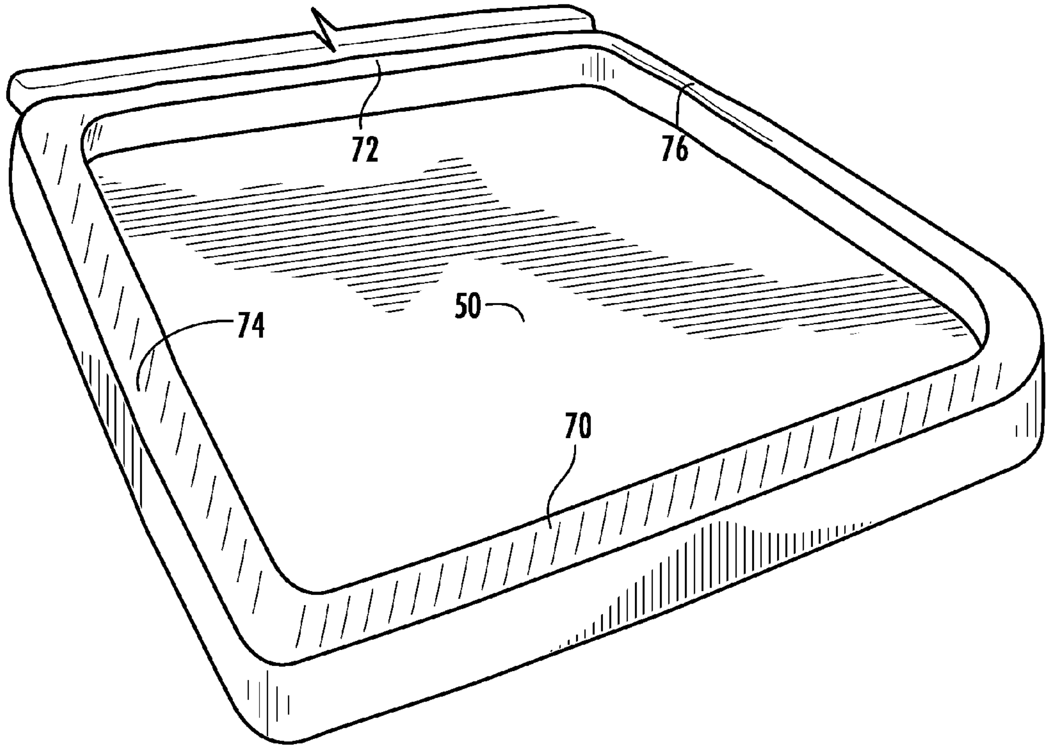
FIG. 15 is a perspective view of a clay tile with tile borders in accordance with an embodiment of the present invention.
Figure 16:
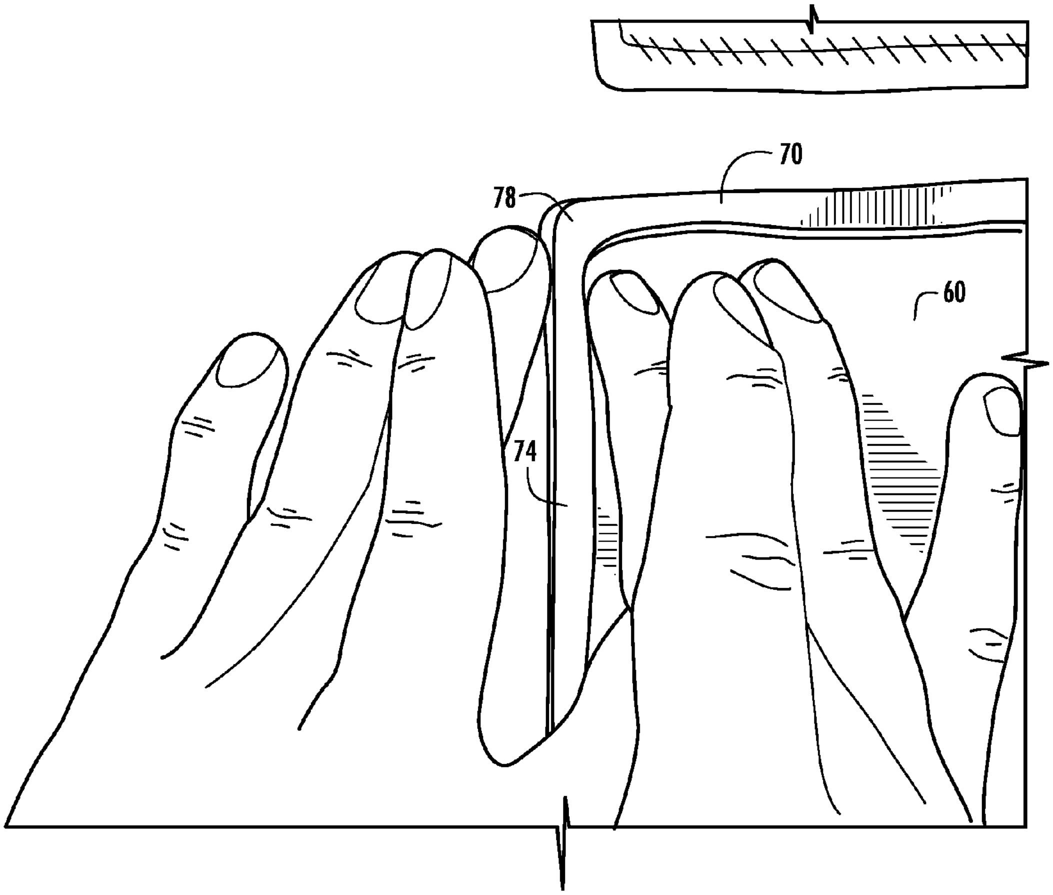
FIG. 16 is a perspective view of the smoothing of the clay tile of FIG. 15.

Referring to FIGS. 14 and 15, border 58 is then cut into segments 70, 72, 74, and 76 having lengths that match the length of the sides of tile 50 and are placed on tile 50 such that hash marks 66 located on border 58 coalign with the hash marks located on a side of tile 50, line 62 coaligns with line 64, and the angled side of these segments face outward. The corners of segments 70, 72, 74, and 76 are scored and slipped in the same manner as described above so that the segments adhere to one another at the corners as well as to tile 50. The user mists his/her hands and runs fingers down the inside and outside of the sides of segments 70, 72, 74, and 76 in order to assure these segments are flush with the sides of tile 50 as shown in FIG. 16. This step is repeated until all four sides of tile 50 have been lined up with segments 70, 72, 74, and 76.

Sea sponge 59 is wetted and used to gently apply light pressure to the tops of segments 70, 72, 74, and 76 to assure that the slip applied between these segments and tile 50 is evenly distributed. An amount of pressure that can reshape or remodel segments 70, 72, 74, and 76 should not be used. This process also blends the clay for aesthetics where segments 70, 72, 74, and 76 have been added to each other and to tile 50. Joints 78 are preferably rubbed with wetted sea sponge 59 to assure tile 50 looks like one piece.

Figure 16B:
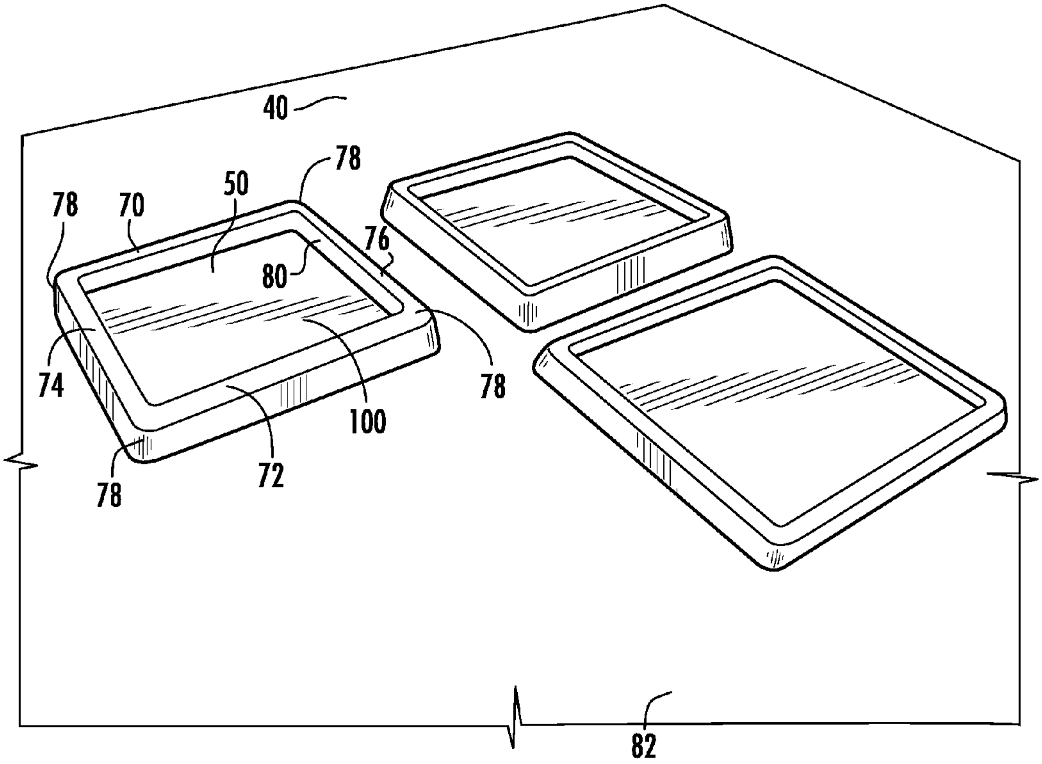
FIG. 16*b* is a perspective view of several clay tiles in accordance with an embodiment of the present invention.

Referring to FIGS. 16 and 16*b*, the inside portions of segments 70, 72, 74, and 76, collectively denoted by 80, should be as close as possible to right angles (90°) so that they are perpendicular with respect to tile 50, which will give the mosaics a support wall when applied to the tile as described below. The user may apply relatively gentle pressure to the sides of the tile, such as segment 74, with his or her hands as illustrated in FIG. 16. The shaped tiles, such as tile 50, are returned to plywood square 40 and allowed to dry for about an hour in order to stiffen. In another embodiment, tiles can be moved to a Rialto beige tile approximately sixteen inches (16") in length and sixteen inches (16") in width to finish drying. It should be apparent that the completed tiles may be placed on any sized surface made out of any material that will allow the tiles to finish drying without warping or adhering to the surface. The tiles (e.g., tile 50) are then allowed to dry for about twenty-four (24) hours. Ideally, the tiles should be checked every three to four hours to see if the corners have lifted while drying. If so, pressure should be applied to the corners to position them back on the drying surface for the remainder of the drying process.

Figure 17:
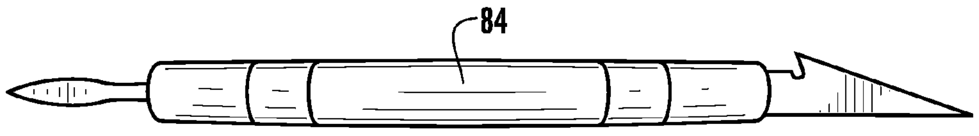
FIG. 17 is a perspective view of a clean-up tool to be used in accordance with an embodiment of the present invention.
Figure 18:
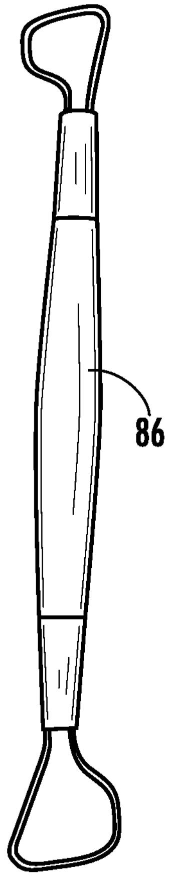
FIG. 18 is a perspective view of a ribbon tool to be used in accordance with an embodiment of the present invention.
Figure 19A:
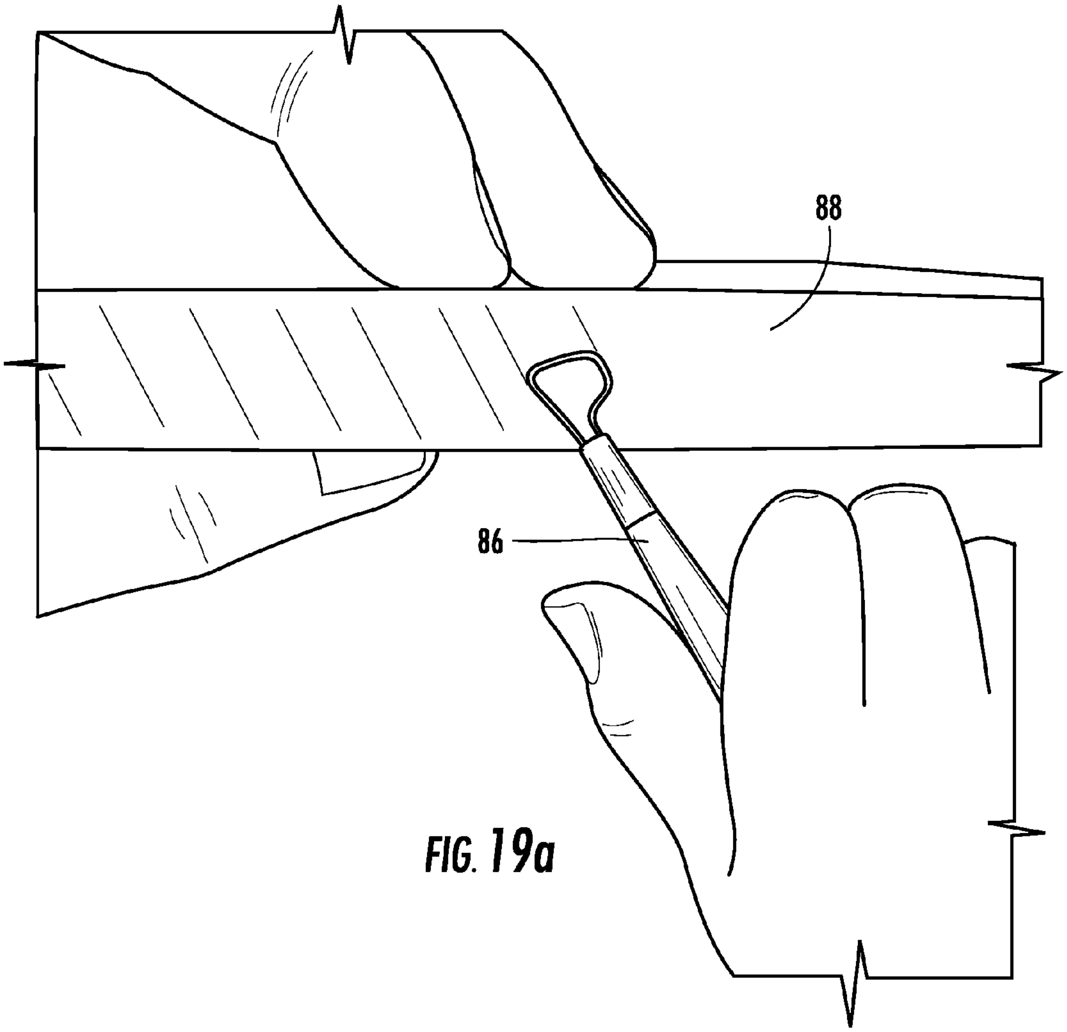
FIG. 19*a* is a side view of a clay tile illustrating a use of the ribbon tool of FIG. 18 in accordance with an embodiment of the present invention.
Figure 19B:
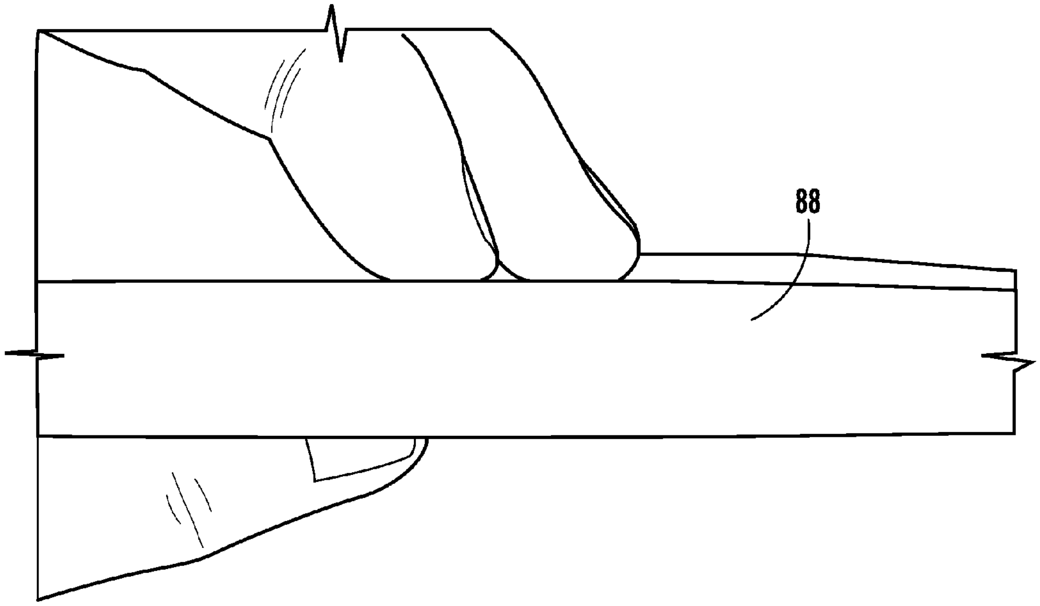
FIG. 19*b* is a side view of the clay tile of FIG. 19*a* in accordance with an embodiment of the present invention.

After drying, the tiles are inspected for cracks, breakage, or serious flaws, and if found, the tiles are discarded into the bucket containing slip. The bottom and sides of each tile, such as tile 50, may be scraped such as by using clean-up tool 84 and a ribbon tool 86, examples of which are illustrated by FIGS. 17 and 18, respectively, to remove any sharp edges. Referring to FIGS. 19*a*, 19*b*, 20*a*, and 20*b*, the edges of tile 50 should ideally be rounded (as denoted by 88) instead of squared (as denoted by 90). Clean-up tool 84 and ribbon tool 86 can be used repeatedly to scrape and smooth tile 50 until it exhibits the desired shape and finish. Tools 84 and 86 also can be used to smooth over the entire tile 50 and to remove any loose particles. Clean-up tool 84 and ribbon tool 86 should be known to one of ordinary skill in the art, and any such tools, like the clean-up tools and ribbon tools manufactured by Kemper Enterprises, Inc. (Chino, Calif.), may be used.

Figure 20A:
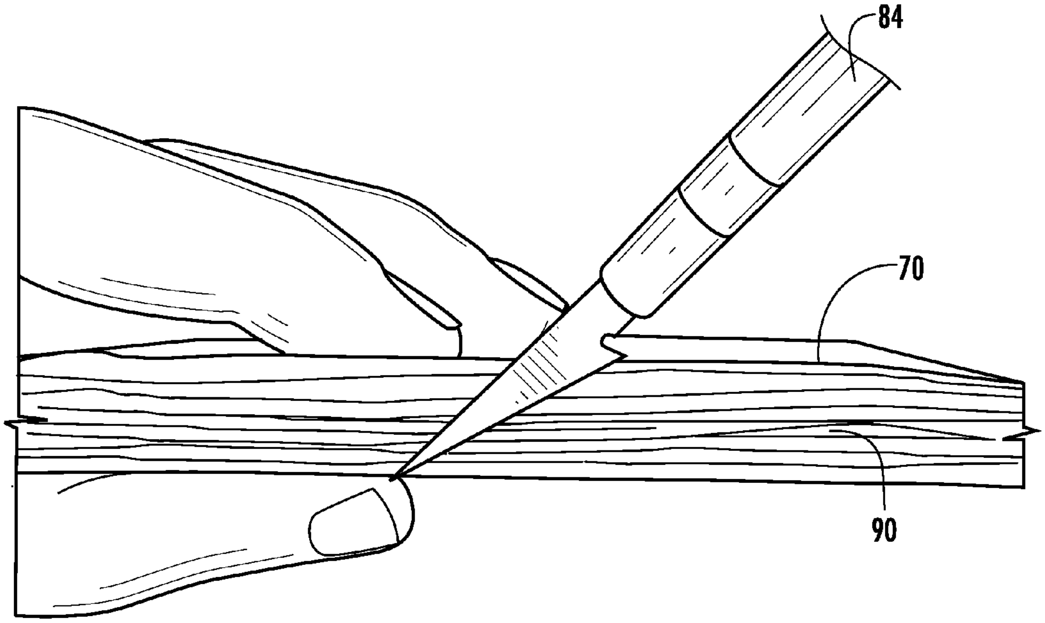
FIG. 20*a* is a side view of a clay tile illustrating a use of the clean-up tool of FIG. 17 in accordance with an embodiment of the present invention.
Figure 20B:
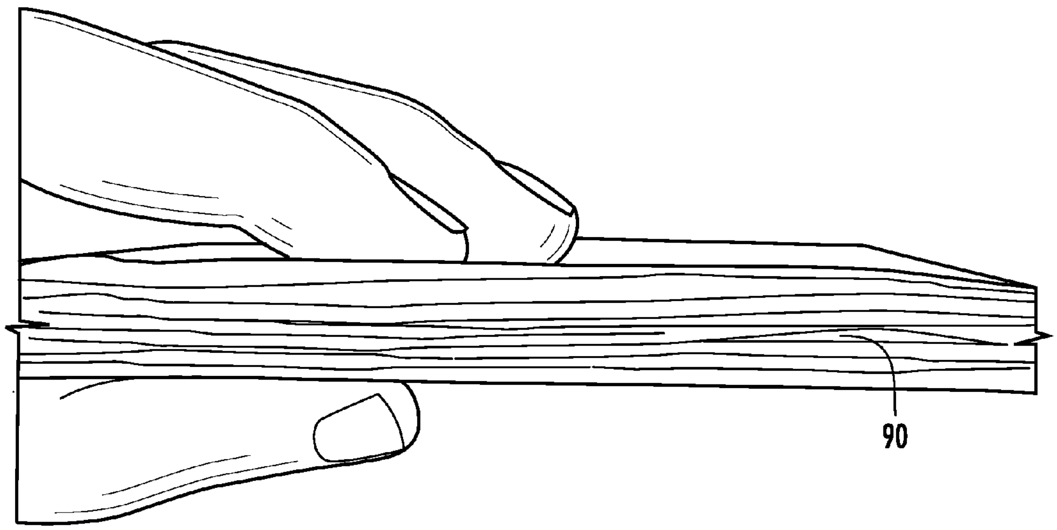
FIG. 20*b* is a side view of a clay tile in accordance with an embodiment of the present invention.
Figure 21:
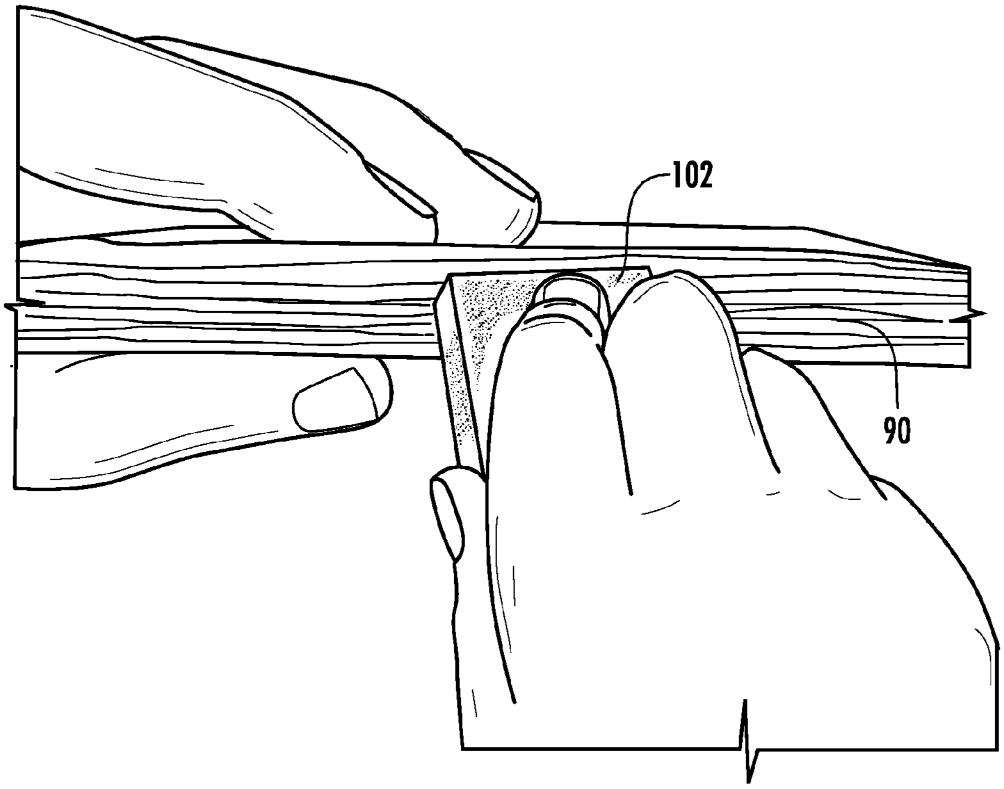
FIG. 21 is a side view illustrating a use of sandpaper in accordance with an embodiment of the present invention.

Referring to FIG. 20*a*, clean-up tool 84 is then used to ensure borders 70, 72, 74, and 76 form as close to a right angle (90°) as possible with base 100 (FIG. 16*b*) of tile 50. This may be accomplished by pressing the flat part of tool 84 against the inside and outside of the borders of tile 50, such as border 70. If lines are visible showing where segments 70, 72, 74, and 76 were attached to form tile 50, wet sponge 59 is used to smooth these lines and form one continuous tile 50. Referring to FIG. 21, tile 50 is then wiped extremely lightly with sandpaper 102, which is preferably one hundred fifty (150) grit sandpaper, in order to remove any rough lines or marks from the scraping process. Sandpaper 150 should also be known to one of ordinary skill in the art.

The finished tiles are then fired in a kiln. One skilled in the art should understand that the process of firing tile is known in the art and can be done by a number of individuals, companies, or services. The tiles should be low fired if they are to be used as decoration on the wall or high fired if they are going to be used as flooring. The higher the heat or temperature during the firing process, the more the tiles will shrink and change color. The user must, therefore, consider the type of tile and/or clay to use based on the qualities and changes it will exhibit during firing as well as the temperature and time at which the tile will be fired.

In another embodiment, decorative mosaics are added to the tiles after they have been fired. Decorative mosaics should be known by one of ordinary skill in the art and can be purchased from Mosaic Art Supply (Atlanta, Ga.; www.mosaicartsupply.com). These mosaics are generally three-eights of an inch (3/8") wide by three-eights of an inch (3/8") long and one-eighth of an inch (1/8") in height. While it is important to note that mosaics of other sizes may be used, the mosaics' dimensions should allow them to be placed within borders 70, 72, 74, and 76 of tile 50, specifically so that no mosaic extends above the height of the plane created by the borders.

Figure 22:
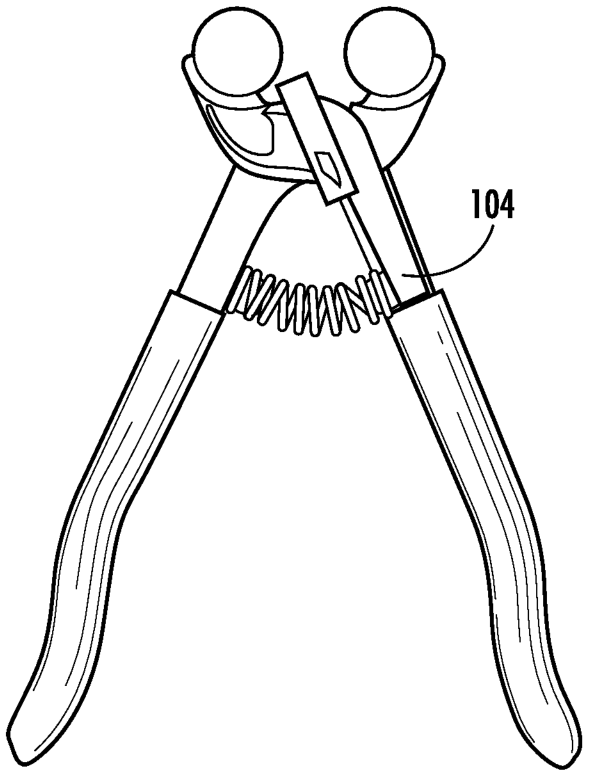
FIG. 22 is a top view of a tile nipper to be used in accordance with an embodiment of the present invention.
Figure 23:
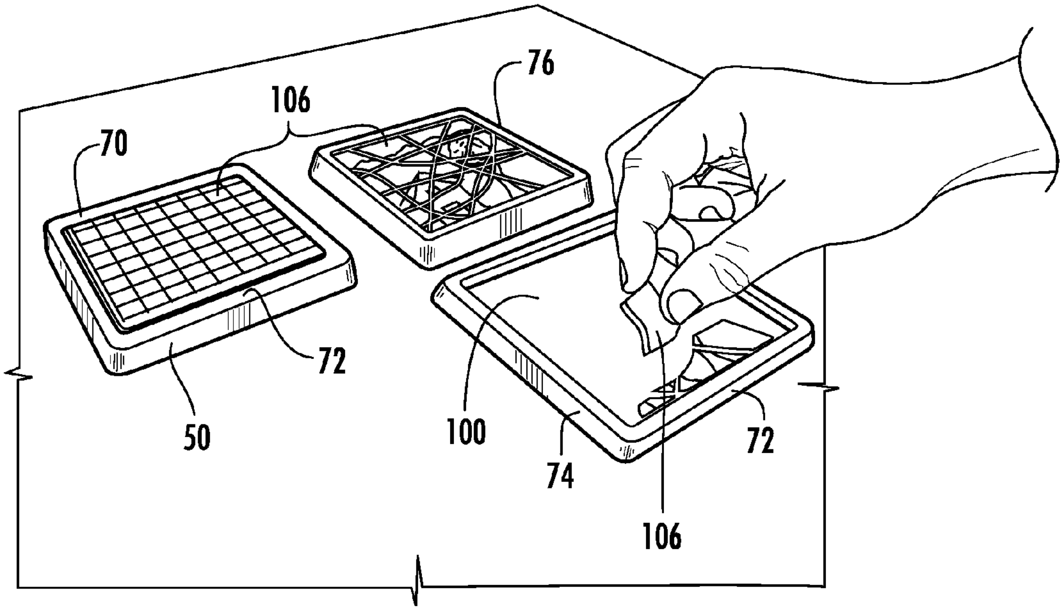
FIG. 23 is a perspective view of an application of mosaics to a clay tile in accordance with an embodiment of the present invention.

Referring to FIGS. 22 and 23, mosaics 106 can be cut with tool 104 commonly referred to as a tile nipper. Any suitable tile nipper, such as the MOSAIC GLASS CUTTER manufactured by Mosaic Art Supply (Atlanta, Ga.), may be used. Other pieces of decorative glass or material, such as that from old vases or other decorative tile, may be used as suitable mosaics as long as they do not extend above the height of the tile's borders 70, 72, 74, and 76 because this may cause injury if used. Thus, mosaics 106 may be relatively uniform in height, and may be pieces of decorative glass or created by dividing a larger image, decoration, ornament, etc., as shown in FIG. 23. Mosaics 106 are then attached to tile 50 and to each other using a substantial glue, such as weldbond glue, which can also be purchased from Mosaic Art Supply.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

I claim the following:

1. A method for creating a personalized tile comprising the following steps:

flattening a first section of clay to create a slab of clay;

tracing an outline of a first template into the slab of clay to create a tile base, the tile base having a plurality of edges;

forming a plurality of borders, each of which defines a top surface and an inner surface of the respective border;

forming the personalized tile in a shape of a relatively flat trapezoidal prism by placing each of the plurality of borders on a respective one of the plurality of edges, whereby the top surfaces of the plurality of borders are generally planar thereby defining a top plane of the relatively flat trapezoidal prism after being placed on the plurality of edges, wherein the top plane, the inner surfaces of the plurality of borders, and the tile base define a mosaic area configured to receive at least one mosaic; and attaching the at least one mosaic to the tile base in the mosaic area so that the at least one mosaic does not extend beyond the top plane so that the personalized tile exhibits a relatively flat top surface generally coplanar with the top plane.

2. The method of claim 1 further comprising misting the slab of clay with water; and rubbing the slab of clay with a plurality of fingertips of a user.

3. The method of claim 1 further comprising smoothing the personalized tile, wherein said smoothing is accomplished through the use of a tool selected from the group consisting of a sea sponge, a ribbon tool, and a clean-up tool.

4. The method of claim 1 further comprising scraping the personalized tile, wherein said scraping is accomplished through the use of a tool selected from the group consisting of a ribbon tool and a clean-up tool.

5. The method of claim 1 further comprising wiping the personalized tile with a piece of sandpaper.

6. The method of claim 1 further comprising scoring the plurality of edges; and slipping the plurality of edges.

7. The method of claim 1 wherein the mosaic area is configured to receive a plurality of mosaics so that the plurality of mosaics do not extend above the first plane, the method further comprising attaching the plurality of mosaics to the tile base.

8. A method for creating a personalized tile comprising the following steps:

forming a tile from clay corresponding to a desired set of dimensions, the tile having a plurality of sides and a base, wherein the plurality of sides and the base define a mosaic area for receiving a plurality of smaller mosaics;

creating the plurality of smaller mosaics from at least one larger mosaic; and forming the personalized tile in the shape of a relatively flat prism by attaching said plurality of smaller mosaics to said tile in the mosaic area.

9. The method of claim 8 wherein said creating the plurality of mosaics is accomplished through the use of a tile nipper.

10. The method of claim 8 further comprises:

creating a plurality of sections of clay from a bag of clay;

flatting a first said plurality of sections to create a first slab of clay; and creating an outline in said first slab corresponding to said desired set of dimensions; and removing a portion of said first slab corresponding to said outline.

11. The method of claim 10 further comprising placing said first said plurality of sections within a material; and setting a distance between a roller and a flat surface corresponding to a desired thickness of said base.

12. The method of claim 11 wherein said material is comprised of two pieces of burlap; and said roller and said flat surface are part of a slab-roller.

13. The method of claim 12 further comprising feeding said first said plurality of sections within said material through said slab-roller to create said first slab.

14. The method of claim 13 further comprising scoring said base of said tile; and slipping said base.

15. The method of claim 14 further comprising:

flattening said first said plurality of sections to create a second slab of clay;

cutting a plurality of borders from said second slab of clay;

scoring the plurality of borders; and attaching the plurality of borders to said base to form the tile.

16. The method of claim 8 wherein the relatively flat prism is a trapezoidal prism.

17. A method for creating a personalized tile in the shape of a relatively flat rectangular prism, the method comprising the following steps:

forming a tile base from a first slab of clay;

cutting four borders from a second slab of clay;

attaching said borders to said tile base, wherein said borders and said tile base define a mosaic area for receiving at least one mosaic; and attaching said at least one mosaic to said tile base in the mosaic area, whereby a top surface of each of said borders and said at least one mosaic define a top surface of the personalized tile so that the personalized tile exhibits the shape of the relatively flat rectangular prism.

18. The method of claim 17 further comprising scoring the tile base and the plurality of borders; and slipping the tile base and the plurality of borders.

19. The method of claim 18 further comprising:

wiping the personalized tile with a sea sponge;

wiping the personalized tile with a piece of sandpaper;

drying the personalized tile; and firing the personalized tile in a kiln.

20. The method of claim 17 wherein the second slab of clay comprises the first slab of clay.

* * * * *